UNITED STATES PATENT OFFICE.

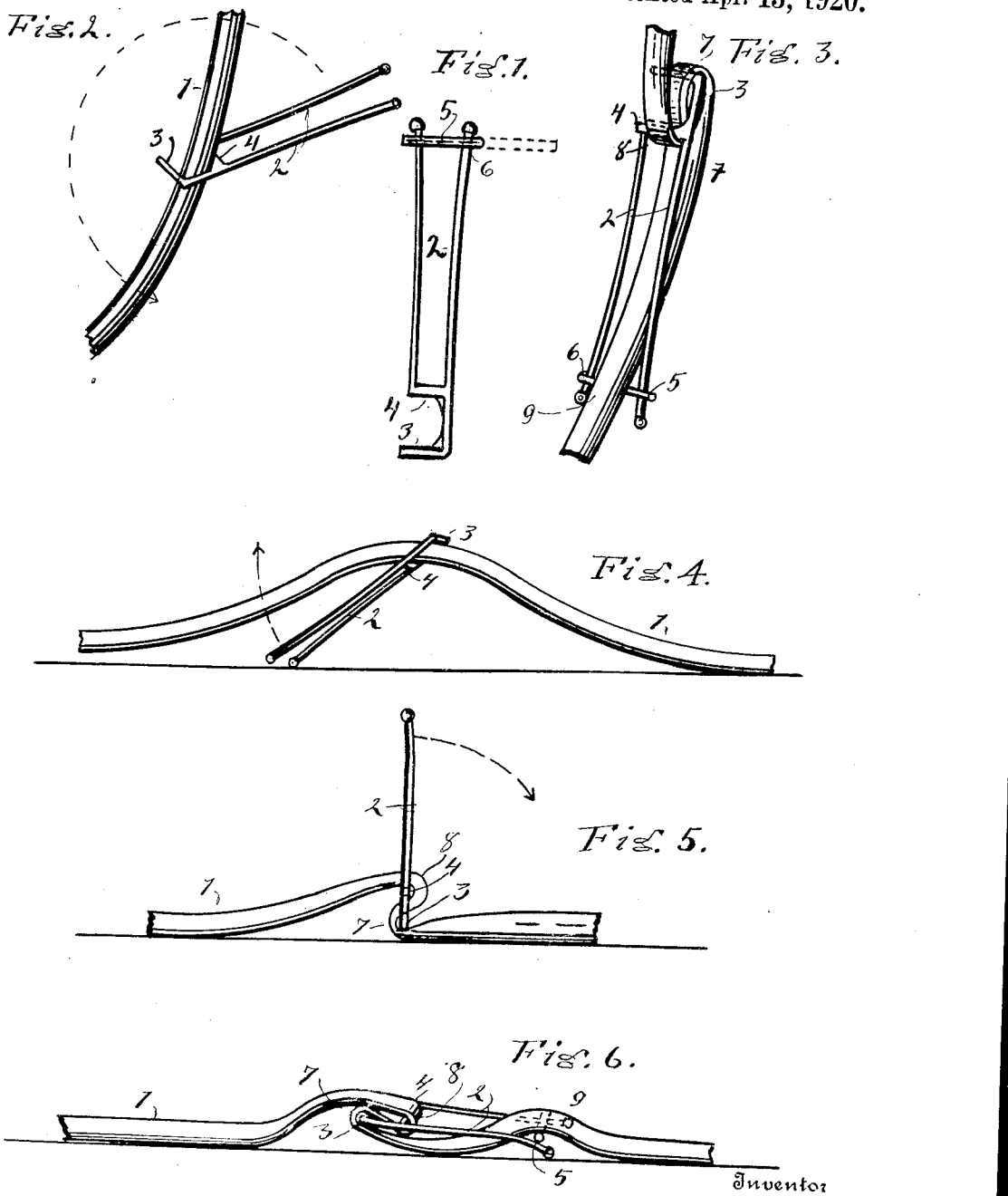

WALTER F. CORBIN, OF GRAND RAPIDS, MICHIGAN.

IMPLEMENT FOR KINKING FIRE-HOSE.

1,336,891.  Specification of Letters Patent.  Patented Apr. 13, 1920.

Application filed March 24, 1919. Serial No. 284,848.

*To all whom it may concern:*

Be it known that I, WALTER F. CORBIN, a citizen of the United States, residing at Grand Rapids, in the county of Kent and State of Michigan, have invented certain new and useful Improvements in Implements for Kinking Fire-Hose, of which the following is a specification.

My invention relates to improvements in implements for "crimping" heavy water, or fire hose, and its object is to provide an implement with which a hose may be readily folded over itself, or bent into an S form for the purpose of readily cutting off the flow of water therethrough, in case of an emergency when it would be disastrous or inconvenient to shut off the water at the hydrant.

I attain this object by the implement shown, and the operation indicated in the accompanying drawing, in which Figure 1 is an elevation of the implement. Fig. 2 shows the manner of applying the implement upon a vertically suspended hose. Fig. 3 shows the position of the implement and hose when the "kink" has been formed. Fig. 4 shows the manner of applying the implement upon a horizontal hose. Fig. 5 shows the implement and hose in the position necessary for forming the "kink," and Fig. 6 shows the "kink" fully formed in a horizontal hose, and the implement secured in place thereon.

Similar numerals indicate similar parts throughout the several views.

This implement consists of a lever formed with two handles, 2, so formed that they may be readily made to pass by on opposite sides of a hose 1, and having an inner cross bar 4, at right angles therewith and to which both handles are integrally connected, and an outer cross bar 3, parallel with the inner cross bar, and so arranged that the two cross bars may be placed upon opposite sides of the hose, as indicated in Figs. 1 and 4. To form the "crimp" or "kink" in the hose the implement is carried around in the direction indicated by the several arrows shown in the drawing, until the handles are brought into position parallel with the end of the hose opposite that to which the handles incline when first applied. This movement forms the two loops shown at 7 and 8, forming as nearly a perfect S bend in the hose as is possible.

By this means, it will be readily understood, the inner surfaces of the hose will be brought so closely together, at 7 and 8, as to wholly dam, or cut off the flow of water at these points, no matter where in the length of the hose the application may be made.

For the purpose of securing this implement in place upon the hose so the operator may leave it and proceed to the duties for which the water was cut off, I provide some suitable means whereby it may be anchored with the hose as, for instance, the placing of a pivotally operated cross bar, as 5, upon one handle, as at 6, and arranged to be passed between the implement handles 2 and the hose 1, as shown in Figs. 3 and 6. By the use of this bar, or its equivalent, in the manner described and shown, it will be readily understood that the hose may be left indefinitely without danger of leakage, or of breaking the fiber of the hose.

When wishing to release the hose for the free flow of water it is simply necessary to move the hose at 9 sufficiently to remove the bar 5 and the hose implement may be carried back into normal position, or the pressure of water in the hose may carry it back, and the hose will be, again, in position and condition to carry water as if the crimping implement had not been in use.

It will be readily understood that the action of this implement is so quickly and thoroughly achieved as to render the cutting off of the flow of water a matter of but an instant of time and minor exertion, while if it were necessary for a fireman to resort to a hydrant for the purpose of cutting off the flow of water, it might entail so great a loss of time as to render the use of the operation not only tedious, but very dangerous and destructive to the property upon which the hose is being played.

What I claim as new in the art is:

1. In a hose crimping implement, two parallel handles integrally connected at one end with a cross bar, one handle extended beyond the connecting cross bar and having a right angled bar thereon parallel with the connecting cross bar, said cross bars so arranged that they may be made to engage the hose upon opposite sides and form a double folded S crimp therein, the handles being positioned each side of the hose, and a retaining element between the outer ends of the handles and the hose.

2. In a hose crimping implement, two parallel handles integrally connected with a cross bar at one end, one of said handles extending beyond the cross bar and having a second cross bar parallel with the first cross bar, said cross bars arranged to be placed upon opposite sides of a hose and to be carried around with the handles to form a doubled S crimp in the hose with the handles astride of the hose, and a means for anchoring the outer ends of the handles upon the hose.

3. In a hose crimping implement, two parallel handles integrally connected at one end with a cross-bar at right angles with the handles, one handle extending beyond the connecting bar and a right angle arm thereon paralleling the connecting bar, a retaining cross-bar pivotally connected with the outer end of one of the handles and adapted to be swung into place between the two handles and the hose when crimping a hose.

Signed at Grand Rapids, Michigan, March 21, 1919.

WALTER F. CORBIN.